United States Patent Office 2,774,724
Patented Dec. 18, 1956

2,774,724

AIR-BLOWN ASPHALT-RESIN COMPOSITION AND PROCESS OF MAKING SAME

William B. Watson, Park Forest, Ill., assignor to Sinclair Refining Company, New York, N. Y., a corporation of Maine No Drawing. Application April 7, 1953,
Serial No. 347,393

5 Claims. (Cl. 196—142)

My invention relates to the production of novel compositions useful as materials for the manufacture of articles by injection molding.

Injection molding of thermoplastic materials such as petroleum asphalt is widely used for the manufacture of numerous articles. Articles can be prepared from these materials at a much lower cost than similar products manufactured from plastics, wood or, in some instances, paper. When petroleum asphalt is used for injection molding it is usually mixed with about 40 percent of asbestos or other fibrous filler at a temperature of about 400° to 500° F. The resulting mixture is injected under pressure into a metal mold. The molded article is then cooled to about 200° F. by means of water circulation through the mold and subsequently is withdrawn as a finished product.

While ordinary asphalt is satisfactory for the manufacture of some articles by this procedure, it is not satisfactory for the manufacture of other articles such as pipe couplings for coal tar impregnated fiber pipe, aircraft spark plug containers, dust seals for railroad car wheels, packaging spacers for artillery fuses, ducts for automobile air conditioning systems, and glove compartments for automobiles. Such articles, when molded from asphalt, do not have sufficiently high tensile strength, resistance to shattering or rigidity under conditions of use. For example, a friction fitted coupling for pipe requires high resiliency and resistance to fracture. Moreover, articles molded from asphalt lack good solubility resistance to petroleum oils and desirable dimensional stability under varying temperature conditions of use.

I have found that air-blown mixtures of paraffinic petroleum resin fractions and petroleum asphalts have special value in the manufacture of articles by injection molding. The resulting compounds provide low cost molding materials for the manufacture of articles of high tensile strength and rigidity, excellent resistance to shattering and dimensional stability at temperatures of use and satisfactory solubility resistance to petroleum oils. Thus, the compounds are not only valuable for the manufacture of ordinary molded asphalt articles but they provide particular advantages for the manufacture of articles requiring special properties such as those described above.

The paraffinic petroleum resin fraction component of my molding compound is the residual material remaining after conventional solvent extraction of a heavy paraffin base lubricating oil stock. For example, to obtain the resin a heavy residual lubricating oil fraction of a paraffin base crude is contacted with a solvent, e. g. propane, to precipitate the insoluble constituents of the lubricating oil fraction. This precipitate or extracted residue is subsequently recovered as petroleum resin. The lubricating oil fraction treated may be a cylinder or bright stock from a paraffin base crude. Other solvents such as ethane or butane may be used to produce the extracted residue or petroleum resin. The resins are characterized by their tackiness and high viscosity index, generally above about 90. For my molding compound, the petroleum resin must have a Saybolt Universal viscosity at 210° F. of about 2500 to 8000 seconds. I have found that the viscosity of the resin component is important as a high viscosity resin results in a brittle product and a low viscosity resin results in a soft product, neither of which has a sufficiently high tensile strength for the manufacture of articles such as those described above.

By the term asphalt, I mean the term as conventionally applied to the residual material obtained from naphthenic or mixed, i. e. Mid-Continent, base crude petroleum stocks, for example, by distillation or by propane extraction of reduced crudes. The asphalt component of the molding compound can be any naphthenic or mixed, i. e. Mid-Continent, base asphalt whose air blowing characteristics are such that when it is air-blown to a 300° F. softening point at an elevated temperature, e. g. about 350° to 650° F., its needle penetration at 77° F. (100 grams/5 seconds) will be about 5 or less. An asphalt having a needle penetration of about 20 to 80 at 77° F., obtained by conventional propane treatment of a Mid-Continent reduced petroleum crude is particularly satisfactory.

The molding compound is produced by air-blowing a mixture of the paraffinic petroleum resin fraction and the asphalt at an elevated temperature. The air blowing rate does not appear to affect the quality of the product but does affect the processing time. An air rate of about 0.01 to 5.0 cubic feet per hour per pound of mixture is a satisfactory practical operating range. Temperatures of about 350° to 650° F. are preferred for practical operating temperatures but blowing time can be decreased by further elevation of temperature. The process may be operated with or without a catalyst. Conventional air blowing catalysts such as iron naphthenate may be used to reduce processing time. Surprisingly, I have found that the resin and asphalt must be air-blown as a mixture to produce a satisfactory molding compound. Blowing the components separately and then blending the air-blown components results in unsatisfactory products that do not have a sufficiently high softening point or tensile strength for use as a molding compound. Moreover, the separately blown components are not satisfactory for use as molding compounds alone. The separately blown resin does not have a sufficiently high softening point or tensile strength or a sufficiently low needle penetration and the separately blown asphalt does not have a sufficiently high tensile strength.

The proportions of the components of the mixture are important in that I have found that too high a resin content, for example, about 75 percent, results in too soft a product with borderline tensile strength while too low a resin content, for example, about 25 percent, results in a low tensile strength, brittle product. A resin proportion of about 30 to 70 weight percent of the mixture produces a good tensile strength product.

I have also found that the substitution of a low viscosity index extract oil, from the phenol extraction of a heavy Mid-Continent base lubricating oil stock, for the resin component results in a low tensile strength, brittle product that is not suitable for molding compounds. The substitution of reduced crudes, for example, a 3100 SUS viscosity reduced crude, also fails to produce compounds of satisfactory tensile strength. Other straight asphalt or asphalt blends are equally unsatisfactory as molding compounds.

The preparation and valuable properties of the molding compounds of my invention will be further illustrated by the following example:

Mixtures of a paraffinic petroleum resin fraction and a Mid-Continent base asphalt were air-blown at elevated temperatures and the products were tested for softening point, needle penetration and tensile strength.

A Mid-Continent base propane asphalt was mixed in equal proportions with a paraffin base petroleum resin. The asphalt had a specific gravity of 1.0157 at 77° F./77° F., a softening point (ring and ball) of 123.5° F. and a needle penetration of 44 at 77° F. The resin had an API gravity of 16.7, a viscosity of 2980 SUS at 210° F. and a viscosity index of 96. The mixture of the asphalt and resin was air-blown at 550° F. for 22 hours at an air rate of 3.5 cubic feet per hour per pound. Tests on the finished molding compound showed that it had a softening point (ring and ball) of 330° F., a needle penetration of 7 at 77° F. and a tensile strength of 230 p. s. i. at 75° F. The molding compound contains a substantial amount of asphaltenes and is generally less than about 75 percent soluble in 88° Baumé petroleum naphtha.

A mixture of the same asphalt and resin in the same proportions was air blown in the presence of 1.0 weight percent of an iron naphthenate catalyst at 500° F. for 27.5 hours at an air rate of 3.5 cubic feet per hour per pound. Tests on this finished molding compound showed a softening point (ring and ball) of 339° F., a needle penetration of 7 at 77° F., and a tensile strength of 233 p. s. i. at 75° F. A similar product was prepared from an identical mixture of asphalt and resin under these same conditions except a catalyst was not used, and it was necessary to increase the processing time to 30.5 hours. Thus a catalyst will reduce processing time without adversely affecting product quality.

To meet the requirements of articles such as the coupling and packaging specialties described above, a satisfactory molding compound for their manufacture must meet a combination of difficult to obtain specifications. For example, it is important for production of molded products subject to conditions of mechanical shock or vibration or sharp thermal variations to have a softening point (ring and ball) of about 300° to 350° F., a maximum needle penetration at 77° F. of about 9 and a minimum tensile strength at 75° F. of about 180 p. s. i. In addition, the material must be rigid, must resist shattering, must be dimensionally stable while cooling from about 200° F. down to room temperature and must not exhibit cold flow at temperatures below about 125° F.

The test results on the compounds produced as described above show that they fully meet these specifications and requirements. At the same time the compound is competitive with asphalt specialties since it can be produced and marketed at relatively low cost.

I claim:

1. A molding compound consisting essentially of an air-blown mixture of an asphalt whose air blowing characteristics are such that when air-blown to about a 300° F. softening point at an elevated temperature its needle penetration at 77° F. will not be more than about 5, and a paraffinic petroleum resin fraction having a Saybolt Universal viscosity at 210° F. of about 2500 to 8000 seconds, said resin fraction being about 30 to 70 weight percent of said mixture.

2. The molding compound of claim 1 in which the asphalt is an asphalt having a needle penetration of about 20 to 80 at 77° F.

3. A method of manufacturing a molding compound which comprises mixing an asphalt whose air blowing characteristics are such that when air-blown to about a 300° F. softening point at an elevated temperature its needle penetration at 77° F. will not be more than about 5, and a paraffinic petroleum resin fraction having a Saybolt Universal viscosity at 210° F. of about 2500 to 8000 seconds to obtain a mixture in which said resin fraction is about 30 to 70 weight percent of said mixture, and introducing air into said mixture while maintaining the mixture at an elevated temperature.

4. The method of claim 3 in which air is introduced into said mixture while the mixture is maintained at a temperature of about 350° to 650° F.

5. The method of claim 4 in which the asphalt is an asphalt having a needle penetration of about 20 to 80 at 77° F.

References Cited in the file of this patent

UNITED STATES PATENTS

| Number | Name | Date |
|---|---|---|
| 1,751,848 | Winkelmann | Mar. 25, 1930 |
| 2,143,872 | Forrest et al. | Jan. 17, 1939 |
| 2,308,245 | Ortynsky | June 12, 1943 |
| 2,627,498 | Fink et al. | Feb. 3, 1953 |
| 2,635,054 | Doyle et al. | Apr. 14, 1953 |
| 2,649,384 | Anderson | Aug. 18, 1953 |